United States Patent [19]

Rodriguez et al.

[11] Patent Number: 5,305,589
[45] Date of Patent: Apr. 26, 1994

[54] MULCHING DECK

[75] Inventors: Carlos Rodriguez, Ft. Myers, Fla.; C. Robert Christy, 15421 River By Rd.; Felipe Rodriguez, 4619 New Haven Dr., both of, Ft. Myers, Fla. 33908

[73] Assignees: C. Robert Christy; Felipe Rodriguez, Ft. Myers, Fla.

[21] Appl. No.: 891,957

[22] Filed: May 26, 1992

[51] Int. Cl.$^5$ .................. A01D 34/66; A01D 34/73; A01D 34/82

[52] U.S. Cl. ......................... 56/320.1; 56/2; 56/17.4; 56/17.5; 56/255

[58] Field of Search ............... 56/320.1, 320.2, 13.6, 56/13.8, 2, 6, 255, 295, 17.4, 17.5, DIG. 9, DIG. 17, DIG. 20

[56] References Cited

U.S. PATENT DOCUMENTS

| | | |
|---|---|---|
| 2,685,774 | 8/1954 | Williams . |
| 2,836,024 | 5/1958 | Davis et al. .................. 56/13.7 |
| 3,469,376 | 9/1969 | Bacon .................. 56/320.1 X |
| 3,797,212 | 3/1974 | Pursel ......................... 56/255 |
| 3,959,954 | 6/1976 | Halsten ...................... 56/12.8 |
| 4,055,036 | 10/1977 | Kidd ........................... 56/13.6 |
| 4,083,166 | 4/1978 | Haas ........................... 56/13.7 |
| 4,189,903 | 2/1980 | Jackson et al. ............... 56/255 |
| 4,189,904 | 2/1980 | Paker ............................ 56/255 |
| 4,205,512 | 6/1980 | Thorud ........................ 56/13.4 |
| 4,226,074 | 10/1980 | Mullet et al. ............... 56/320.2 |
| 4,318,268 | 3/1982 | Szymanis ..................... 56/255 |
| 4,502,271 | 3/1985 | Hansen et al. ............. 56/320.1 |
| 4,543,773 | 10/1985 | Reilly ........................ 56/13.6 |
| 4,890,446 | 1/1990 | Israel ......................... 56/17.5 |
| 4,916,887 | 4/1990 | Mullet et al. ................ 56/13.8 |
| 4,938,011 | 7/1990 | Pernia ........................ 56/255 |
| 4,951,449 | 8/1990 | Thorud ........................... 56/2 |
| 5,035,108 | 7/1991 | Meyer et al. ........... 56/320.2 X |
| 5,090,183 | 2/1992 | Thorud et al. .................. 56/2 |
| 5,129,217 | 7/1992 | Loehr ................... 56/320.2 X |
| 5,133,176 | 7/1992 | Baumann et al. ....... 56/320.1 X |

OTHER PUBLICATIONS

1991 Toro Wheel Horse-Highly Maneuverable Mowing Machines Brochure.
1991 Toro Wheel Horse-Riding Mowers Brochure.

Primary Examiner—Stephen J. Novosad
Attorney, Agent, or Firm—Saidman Design Law Group

[57] ABSTRACT

A mulching deck particularly designed to handle tall, thick grasses and weeds (dry or wet), and a kit for converting an existing mowing deck into such a mulching deck. The deck features the combination of a closed discharge chute in a multi-bladed rotary mower having a plurality of stationary cutting blades positioned within the rotary blade housing. Deflectors may be provided in the housing for helping to redirect the clippings back into the path of the rotary and stationary blades for further comminution.

33 Claims, 2 Drawing Sheets

MULCHING DECK

BACKGROUND OF THE INVENTION

1. Field of the Invention

This invention relates to rotary lawn or grass mowers, and more particularly, to mulching mowers having a plurality of rotary cutting blades, such as mowing decks commonly found on lawn tractors, garden tractors and commercial mowing tractors. The invention provides a new and improved mulching deck as well as a kit for converting an existing mowing deck into an improved mulching deck.

2. Description of Related Art

The conventional lawn tractor, garden tractor, or commercial mowing tractor has a plurality of rotary cutting blades, typically numbering from two to five, although larger commercial models may include many more. They are used to mow a variety of types of grass under a variety of conditions: household lawns, landscaping lawns adjacent public and corporate buildings, golf course fairways and roughs, fields, and weeds alongside roadways, to name a few.

The usual mowing tractor cuts the grass and discharges the clippings either into a grass collector or onto the grass beside the mowing deck's discharge chute. When the clippings are collected, frequent dumping of the grass collector, along with subsequent disposal of the clippings, entails a considerable cost in time and money, especially when the mowing has been commercially contracted.

In those instances in which the grass is not collected, other problems arise. Because of the danger of injury to people or damage to property caused by the forcible ejection of hard objects from the mowing deck, most mowing decks are installed with a spring-biased flap covering the discharge chute. As a result, the clippings are deposited in dense windows adjacent the discharge chute of the mowing deck. When the grass is heavy or wet, the clippings form grass-smothering clumps which often kill the underlying grass, producing bare spots which are unsightly and which promote erosion.

It is ecologically desirable, and more cost efficient, to mulch the clippings. As mulch, the clippings are directly absorbed into the lawn or field, returning to the soil the nutrients extracted therefrom for their growth, thus promoting lush growth as well as preventing the aforesaid erosion. Mulching the clippings also removes the necessity to bag and dispose of the clippings.

In the past, the conversion to mulching mowers of hand-propelled, discharge-type lawn mowers has received much attention as a field of invention.

Williams, U.S. Pat. No. 2,685,774, enclosed a reel-type lawnmower with a flexible screen having cutter ribs mounted internally therein. The reel blades coact with the ribs in the manner of scissors to mulch the clippings.

Davis et al, U.S. Pat. No. 2,836,024, provide a rotary cutting blade which cuts standing grass and lifts the clippings above the plane of the blade. A plurality of stationary blades are located immediately above the rotary blade which scissor the clippings into mulch.

Halsten, U.S. Pat. No. 3,959,954, lifts the clippings into an apertured housing having a plurality of free-swinging flails therein. The flails beat the clippings until they are comminuted sufficiently to pass through the apertures as mulch.

Hass, U.S. Pat. No. 4,083,166, fixes a rotary disc with cutting blades coaxially above a rotary cutting blade. The rotary cutting blade cuts the grass and lifts the clippings through large openings in the disc into the path of the disc's cutting blades.

Jackson et al, U.S. Pat. No. 4,189,903, supplying a mulching attachment for single-bladed rotary mowers. The attachment comprises a linear mounted internally of the mower housing above the rotary blade. The liner is continuous around its periphery, thereby closing any discharge chute the mower may have. Guide vanes are located internally of the liner to deflect or direct the clippings inwardly and downwardly. A special rotary cutting blade has an outer region which cuts the grass and lifts the clippings upwardly into contact with the guide vanes. An inner region of the blade has a sharpened cutting edge for mulching the downwardly deflected clippings followed by a downwardly directed edge for blowing the twice-cut clippings into the grass.

Paker, U.S. Pat. No. 4,189,904, converts a conventional rotary mower into a mulching mower by covering the discharge chute with a plate. The plate has a plurality of tines and openings formed thereon to mulch grass or leaves.

Thorud, U.S. Pat. No. 4,205,512, like Jackson et al, provides guide vanes, "kickers", within the mower housing to direct clippings inwardly and downwardly into a sharpened edge of the rotary cutting blade.

Szymanis, U.S. Pat. No. 4,318,268, uses a compound blade, like Jackson et al, having an outer region which cuts and lifts the clippings and an inner region which further cuts and blows the clippings downwardly into the grass. Szymanis provides a toroidal chamber around the outer periphery of the housing to direct the clippings inwardly and downwardly into the compound blade.

Israel, U.S. Pat. No. 4,890,446, affixes a mulching plate upstream of the discharge chute which, with the rotary cutting blade, scissors the clippings prior to exiting through the discharge chute.

Thorud et al, U.S. Pat. Nos. 4,951,449, and 5,090,183, disclose a plurality of kickers which deflect the clippings inwardly and downwardly into secondary contact with the rotary cutting blade for mulching, in the general manner of Jackson et al and Thorud, above.

The above-noted mulching mowers were concerned with the problems of cutting and mulching lawns, such as household lawns. These are relatively small parcels of land with fine grass specially selected for their groomed, decorative look. Multi-bladed mowers, on the other hand, while also used in groomed lawn situations, are additionally required to handle more demanding conditions. Small fields, e.g., two to five acres, as would be found in mini-estates, government installations, golf courses, etc., have a variety of grasses and weeds which need mowing as well. Often, the cycle of mowing is interrupted by other duties or prolonged periods of rain, and the field's grass becomes tall and thick, often accompanied by moisture retained on the lower portions of the grass, even after a few days of sunshine. An added burden is thus placed on multi-bladed mowing machines which the average household lawn mower never faces.

Being tall and dense presents additional problems. Bagging acres of grass is clearly very time consuming and inordinately expensive. If the cut grass and weeds are simply discharged in windrows, they tend to stifle the growth beneath them. Mulching would be desirable, if it could be attained under these extremely adverse conditions.

Multi-bladed mowers have been developed. To date, however, they have not been completely adequate for the task.

Some multi-bladed mowers concentrate on spreading the clippings more evenly. Examples include Bacon, U.S. Pat. No. 3,469,376, and Hansen et al, U.S. Pat. No. 4,502,271, both of which provide baffles and deflectors positioned to spread the discharge of the clippings over a wider area. Reilly, U.S. Pat. No. 4,543,773, places anti-blowout plates adjacent each rotary blade at the lower edge of the housing skirt to prevent windrowing due to clippings being blown out from under the housing upstream of the discharge chute.

Multi-blade mulching decks have been proposed. Exemplary are Mullet et al, U.S. Pat. No. 4,226,074, Mullet et al, U.S. Pat. No. 4,916,887, Pernia, U.S. Pat. No. 4,938,011, and the application of Thorud's concepts, discussed above, to multi-blade mowers by The Toro Company of Minneapolis, Minn.

Mullet et al ('074) provide manually operated gates which close exit channels from each of the rotary cutting blades, effectively isolating each blade in its own internal chamber. The clipped grass is recirculated within each individual chamber until comminuted into mulch by the blade which clipped it.

Mullet et al ('887) install baffles to guide all clippings from the plurality of rotary cutting blades into a separate set of mulching blades, the mulching blades being located immediately before the discharge chute.

Pernia closes the discharge chute with a panel having a plurality of fixed blades selectively mounted thereon. The clippings impact the fixed blades, are further cut, and fall to the ground.

And, The Toro Company shapes the housing to provide a separate chamber for each rotary blade to essentially isolate it from the others. Kickers, shaped and placed as described in the Thorud patents discussed above, are provided in each chamber to recirculate the clippings back into comminuting contact with the blade which initially cut the clippings.

These mulching mowers, while undoubtedly suitable for lawn-type environments, can be inadequate, when cutting tall or dense grass, especially if the grass is wet. Simply covering the discharge chute with a panel and fixed blades is often insufficient to completely mulch the volume of clippings produced by multi-bladed mowing decks. In like manner, individual blades which cut heavy weeds and subsequently chop the recirculated clippings for comminution can be overloaded. It is customary when mowing dense grass with a multi-bladed mower to use only one-third to one-half of the cutting width of the mowing deck for cutting a new path. The most upstream of the blades is the only one which is actually cutting grass. The remaining blades act principally to blow the dense clippings from the housing, while secondarily cutting grass remaining standing from the last pass. When too much grass is circulated adjacent any one blade, that blade becomes jammed and stops, causing the drive belt to pass over a stationary pulley creating heat which burns and severs the belt. Isolating each blade in its own chamber promotes blade overload.

There exists, therefore, a need for a mulching deck for multi-bladed mowers, which is capable of mulching grass under all conditions likely to be encountered, including very tall, dense, and wet grass or weeds.

OBJECTS OF THE INVENTION

It is an object of the present invention to provide an efficient mulching deck for a multi-bladed mower.

It is a further object of the present invention to provide a method and means for converting the conventional multi-blade mowing deck into an efficient mulching deck.

Another object of the invention is to provide a mulching deck which is so similar to a conventional mowing deck that minimal modification of the conventional mowing deck is necessary to convert it into a mulching deck, thereby providing considerable savings in retooling for manufacturing the mulching deck or for retrofitting existing decks.

Other objects will become apparent to those skilled in the art from the following description of the invention.

SUMMARY OF THE INVENTION

A mulching deck is disclosed which includes guide means for directing or deflecting clippings generated by one rotary cutting blade into the cutting path of an adjacent rotary cutting blade. Stationary cutting blades are fixed to the housing in locations such that they intercept clippings entrained in eddy currents created by the rotary cutting blades rotating within the housing.

Additionally, a mulching deck is disclosed in which a conventional mowing deck is modified to convert it into a mulching deck embodying the principles of the invention. The modifications comprise elimination of the conventional discharge chute and internal tunnel leading to the discharge chute.

In both embodiments, deflectors are mounted between adjacent pairs of rotary cutting blades to deflect the clippings from an upstream rotary cutting blade into the cutting path of the immediately adjacent, downstream rotary cutting blade. A stationary cutting blade is fixed to the mulching deck housing in the vicinity of the previously existent discharge chute to receive and comminute the clippings passed on downstream from the most downstream of the rotary cutting blades. Additional stationary blades are fixed to the housing in the paths of clippings entrained in air streams swirling around each of the rotary cutting blades.

A kit for converting a conventional mowing deck to a mulching deck is also provided. The kit comprises plates adapted to cover the discharge chute and tunnel of the conventional mowing deck, deflectors adapted to be mounted between adjacent rotary cutting blades for deflecting the clippings from each rotary cutting blade to the immediately adjacent, downstream rotary cutting blade, and stationary blades adapted to be affixed to the housing for comminuting clippings downstream of the most downstream of the rotary cutting blades and as well as clippings swirling around each rotary cutting blade.

DETAILED DESCRIPTION OF THE PREFERRED EMBODIMENT

Figure 1:
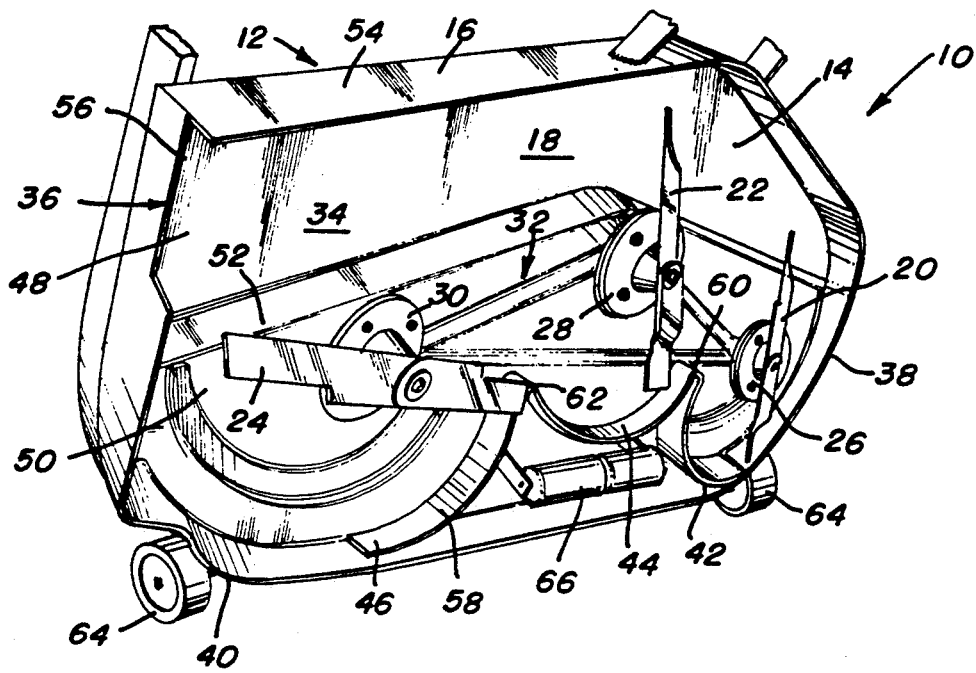
FIG. 1 is a bottom perspective view of a conventional multi-bladed mowing deck.

FIG. 1 shows a typical mowing deck of a conventional tractor-type mower. Mowing deck 10 includes a housing 12 which comprises a top wall 14 (the underside of which is seen in the FIG.s) and a skirt 16 depending from the periphery of top wall 14. Housing 12 defines an internal chamber 18 opening downwardly of the housing.

Three rotary cutting blades 20, 22 and 24 are rotatably mounted in chamber 18. Rotary cutting blades 20-24 are mounted on axles which are rotatably journaled in pedestals 26, 28 and 30, respectively. Pedestals 26-30 are fixedly mounted to the underside of top 14 by any appropriate means, such as by nuts and bolts. Drive means 32, partially shown, provides power to rotary cutting blades 20-24, rotating them in the counterclockwise direction, as viewed in FIG. 1.

In addition to cutting the grass, conventional rotary cutting blades 20-24 create wind currents which lift the clippings upwardly into chamber 18 above blades 20-24. The rotary motion of blades 20-24 also creates air currents tending to flow in a circular stream around each respective blade and in a linear stream in tunnel 34 moving in the direction of motion of the rotary cutting blades, i.e., from rotary cutting blade 20 toward discharge chute 36. Rotary cutting blade 22 is, therefore, located in housing 12 downstream from rotary blade 20, and rotary cutting blade 24 is located downstream from both rotary blades 20 and 22.

The internal structure of housing 12 is configured to guide and reinforce the aforementioned circular and linear air streams. Arcuate end wall portions 38 and 40 of skirt 16 and internal wall portions 42, 44 and 46 partially surround individual ones of rotary blades 20, 22 and 24. The arcuate walls are concentric with the path of the tips of the adjacent rotary blades and are located closely adjacent thereto. Tunnel 34 is formed by contouring the inner surface of top wall 14 to form an upper level 48, a lower level 50, and a step 52 connecting them. A relatively linear portion 54 of skirt 16 provides a third side to tunnel 34. The updraft created by the rotating blades 20-24 effectively provides a fourth side and confines the clippings to tunnel 34. An opening 56 in skirt 16 at one end of tunnel 34 completes the discharge chute 36. The aforesaid air streams tend to concentrate the clippings in tunnel 34 and forcibly eject them through discharge chute 36.

Internal wall portions 42-46 are traditionally made, as shown, by bending a single sheet of material 58 such that the three arcuate wall portions are formed. Two rounded bends 60 and 62 result where adjacent wall portions intersect and terminate. As shown, internal wall portions 42 and 44 intersect and terminate at bend 60 and internal wall portions 44 and 46 intersect and terminate at bend 62. The sheet of material 58 is conventionally permanently attached to housing 12 by welding. Wall portions 42-46 can also be individually made and separately attached to housing 12, if desired.

In operation, rotary cutting blades 20-24 cut the grass into clippings which are lifted above the rotary blades by the updraft created by the rotary cutting blades. Most of the clippings are densely concentrated in tunnel 34 and are forcibly expelled from mowing deck 10 through discharge chute 36. Some clippings are entrained in the circular streams and are forced to circle the blades; they eventually escape into tunnel 34 or drop below housing 12 onto the ground.

Wheels 64 support the mowing deck on the ground, when the deck is in operation. Rollers 66 (only one of which is shown in FIG. 1) are usually off the ground when the deck is attached to a tractor. They support the deck when it is disconnected from the tractor.

Figure 2:
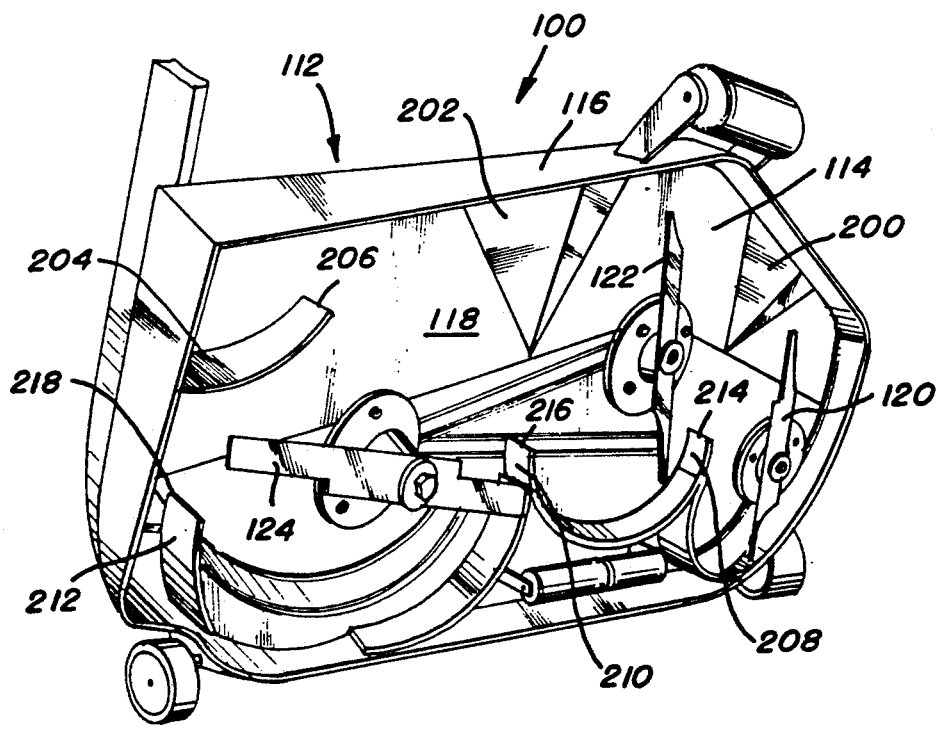
FIG. 2 is a bottom perspective view of the multi-bladed mulching deck embodying the principles of the present invention.

Turning now to FIG. 2, a preferred embodiment of the present invention is shown. Reference numerals which designated previously discussed elements are not shown, for the most part, in order to simplify the drawings. Where referred to in the specification, however, like elements are designated by the same reference numerals incremented by 100. New elements are designated by 200-series numerals.

Mulching decks differ from discharge-type mowing decks in that in a mulching deck the clippings are confined within the housing chamber and continually recirculated until the clippings are comminuted finely enough to fall beneath the cutting blades as mulch into the grass below. In order to be able to provide the mulching function, the mowing deck of FIG. 1 must be modified slightly. For economic and aesthetic reasons, it is desirable to keep the modifications to a minimum. A comparison of the mulching deck of FIG. 2 with the mowing deck of FIG. 1 will show that the modifications are few and seemingly simple. The results of the modifications, however, are immense.

Mulching deck 100 as shown in the preferred embodiment in FIG. 2 has a housing 112 comprising a top wall 114 and a skirt 116 depending from the periphery of top wall 114. Housing 112 defines an internal chamber 118 opening downwardly of the housing. Unlike the mowing deck of FIG. 1, skirt 116 does not include a discharge chute. Rather, skirt 116 is imperforate. The grass clippings are thereby effectively confined to chamber 118. Otherwise, skirt 116 is shaped the same as skirt 16.

Since it is no longer desired to concentrate the grass clippings into a stream for ejection through a discharge chute, top wall 114 is not shaped to provide a tunnel. The internal surface of top wall 114 is substantially flat, except for the presence of a pair of deflectors 200 and 202. Deflector 200 is located between rotary cutting blade 120 and rotary cutting blade 122. Deflector 202 is located between rotary cutting blade 122 and rotary cutting blade 124. Deflectors 200-202 are shaped and located to deflect the clippings produced by one rotary cutting blade into the cutting path of an adjacent rotary cutting blade. In the drawings deflectors 200-202 are shown as triangles joined together to form a pyramid-like structure. They obviously can be otherwise contoured, such as rounded or spiral shaped, so long as they effect their function of deflecting the clippings toward the cutting path of the adjacent, downstream rotary cutting blade.

Rotary cutting blades 120-124, like their counterpart blades 20-24 in the conventional mowing deck, lift the clippings into chamber 118 above the rotary cutting blades and tend to drive the clippings into circular and linear streams. Some of these clippings from rotary cutting blade 120 are carried back into the cutting path of rotary cutting blade 120 by gravity or by the air currents in chamber 118 and are chopped into smaller pieces. Most, however, are blown downstream into contact with deflector 200 which deflects them into the cutting path of rotary cutting blade 122. There, they are further comminuted and either fall as mulch to the ground or are themselves blown further downstream toward rotary cutting blade 124.

In like manner, grass originally cut by rotary cutting blade 122 is either partially recirculated through rotary cutting blade 122 or is deflected by deflector 202 into the cutting path of rotary cutting blade 124. In addition, the clippings originally cut by rotary cutting blade 120 and further cut by rotary cutting blade 122 will likewise be lifted by rotary cutting blade 122 and directed into deflector 202 for deflection into the cutting path of rotary cutting blade 124 for additional comminution.

Rotary cutting blade 124 also cuts the grass in its cutting path, lifts the clippings upwardly in chamber 118, and directs them further downstream. Since there is no rotary cutting blade downstream to receive the clippings passed on by rotary cutting blade 124, another type of cutting blade is provided. Stationary cutting blade 204 is fixed to housing 112 and is located such that its sharp edge 206 faces the stream of clippings being carried by the air currents prevalent in that part of housing 112. These currents include eddy currents created by the lack of a discharge chute and the presence of stationary cutting blade 204. The result is a swirling of the clippings into repeated contact with rotary cutting blade 124 and stationary cutting blade 204. Virtually complete mulching of the clippings occurs during this interaction of rotary cutting blade 124 and stationary cutting blade 204.

A noticeable quantity of clippings is carried in the circular currents travelling around the tips of the rotary cutting blades. By locating a stationary cutting blade in line with such currents, those clippings are also further comminuted sufficiently that they become mulch. Stationary blades 208, 210, and 212 are fixed within chamber 118 such that cutting edges 214, 216, and 218, respectively, face the predominant stream of clippings flowing around the tips of rotary cutting blades 120, 122, and 124. Again, clippings trapped in eddy currents adjacent stationary cutting blades 208-212 are further comminuted by these stationary cutting blades and the adjacent rotary cutting blades.

It has been found that the combination of rotary cutting blades and stationary cutting blades, as described, have been very efficient in mulching very tall and dense grass, even when wet. The effects are especially notable when a cutting path which is less than the width of the mulching deck is utilized. In that case the most upstream blade originally cuts the grass into clippings. The remaining blades relieve the cutting blade of any overload by receiving and finely cutting the clippings. Less strain on the mulching deck has the added benefit of increasing the life of the mowing mechanism.

The embodiment shown in FIG. 2 is a mulching deck manufactured as such. Existing decks, such as the one shown in FIG. 1, can easily and inexpensively be converted into a similar mulcher by means of the kit shown in FIG. 3.

Figure 3:
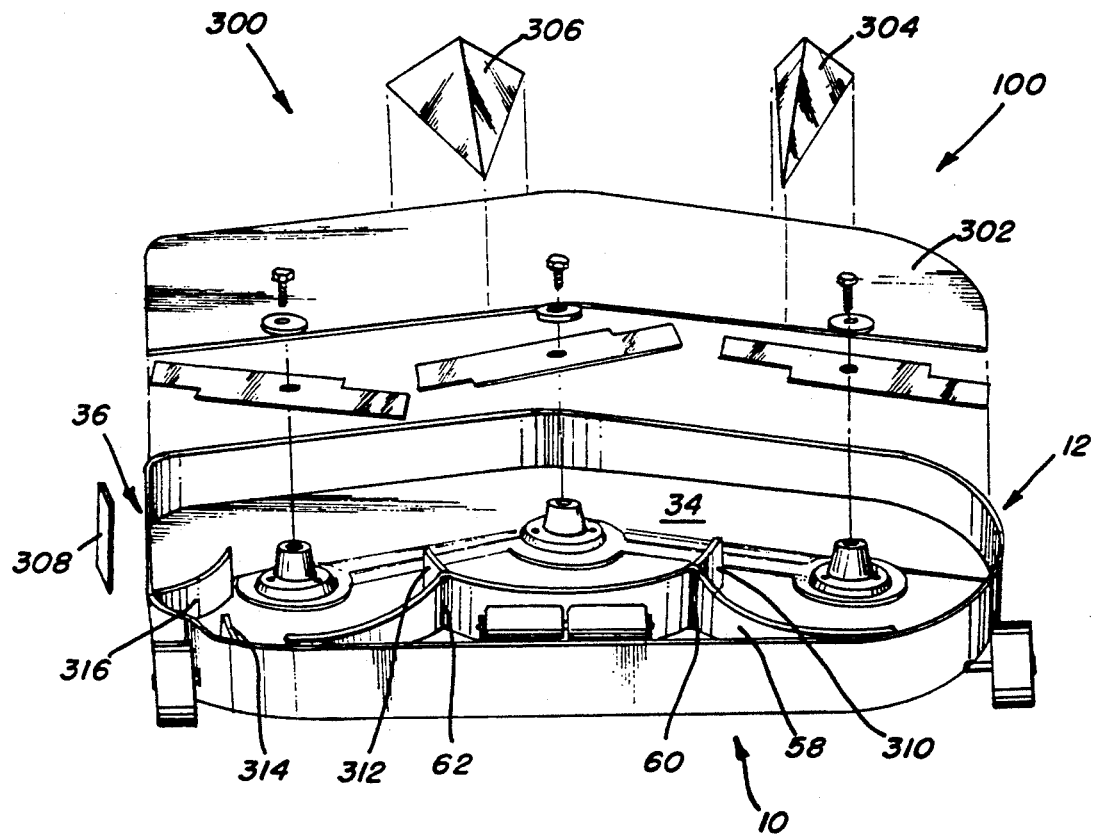
FIG. 3 is an exploded perspective of the underside of the mulching deck of the kit embodiment of the present invention.

FIG. 3 shows the mowing deck 10 of FIG. 1 plus, in exploded form, a kit for retrofitting mowing deck 10 to convert it into the mulching deck 100 of FIG. 2.

Kit 300 comprises a plate 302, a pair of deflectors 304 and 306, plate 308 and four stationary cutting blades 310, 312, 314 and 316.

Plate 302 is shaped and sized to cover tunnel 34. It is affixed by any convenient means to housing 12, such as by welding, if a permanent structure is desired, or by means of threaded fasteners or clips (not shown), should one prefer a removable structure.

Deflectors 304 and 306 can be manufactured integrally with plate 302, or alternatively can be separately fastened thereto. The latter permits adjustment of the deflectors for maximum effectiveness, taking into consideration the different conditions existent within different mowing decks.

Plate 308 is affixed by any convenient means to cover discharge chute 36.

Stationary cutting blades 314 and 316 are permanently or replaceably affixed to skirt 16 and top wall 14 by any suitable means, such as by welding or by threaded fasteners, respectively.

And, stationary cutting blades 310 and 312 are permanently or replaceably affixed to the aforesaid bends 60 and 62 of the strip of material 58.

With this kit, and by following the teachings of the present invention, a conventional mowing deck can be permanently or temporarily converted into an effective, efficient mulching deck.

It can be seen from the above that an invention has been disclosed which fulfills all the objects of the invention. It is to be understood, however, that the disclosure is by way of illustration only and that the scope of the invention is to be limited solely by the following claims.

We claim as our invention:

1. A mulching deck, comprising:
   housing means;
   cutting means in said housing means for cutting grass;
   guide means for directing said cut grass from an upstream one of said cutting means to a downstream one of said cutting means;
   wherein said cutting means includes a plurality of cutting blades and a drive means for driving at least some of said blades; and
   wherein said cutting means comprises a plurality of rotary cutting blades for cutting said grass into clippings and for further cutting said clippings and a plurality of stationary cutting blades for further cutting said clippings;
   wherein said stationary cutting blades includes a stationary cutting blade fixed to said housing downstream of the most downstream of said rotary cutting blades.

2. The mulching deck of claim 1 wherein said stationary cutting blades further includes a stationary blade fixed to said housing adjacent each of said rotary cutting blades for cutting clippings which are substantially swirling about the said adjacent each of said rotary cutting blades.

3. The mulching deck of claim 1 wherein said guide means comprises a deflector means fixed to said housing downstream of an upstream rotary cutting blade for deflecting the grass cut by said upstream rotary cutting blade into the cutting path of the adjacent downstream rotary cutting blade.

4. The mulching deck of claim 3 wherein said deflector means comprises a deflector mounted between each pair of rotary cutting blades.

5. A mulching deck for cutting and mulching grass, said mulching deck comprising:
   (a) a housing comprising a top and a skirt peripherally connected to said top, said top and said skirt defining a downwardly opening chamber, said skirt including an imperforate side wall for confining the grass clippings thereto;
   (b) a plurality of rotary cutting blades interiorly mounted for rotation in said chamber, said rotary cutting blades being adapted to cut grass into clippings and to create an updraft for lifting said clippings above said rotary cutting blades within said chamber, said rotary cutting blades further tending to create swirling and linear air streams within said chamber;

(c) drive means for rotating said rotary cutting blades;

(d) deflector means between a pair of said rotary cutting blades for deflecting at least some of the clippings entrained in at least some of said air streams into the cutting path of an adjacent rotary cutting blade; and (e) stationary cutting blade means in said chamber for further comminuting at least some of the clippings entrained in at least some of said air streams.

6. A mulching deck as in claim 5 wherein said deflector means comprises a deflector mounted on the interior of said housing between each adjacent pair of said rotary cutting blades.

7. A mulching deck as in claim 6 wherein said deflector means are shaped to deflect the clippings entrained in said linear airstream into the cutting path of a downstream rotary cutting blade.

8. A mulching deck as in claim 7 wherein said deflector means comprise a pair of triangularly shaped plates joined to form a pyramid-like structure.

9. A mulching deck as in claim 5 wherein said stationary cutting blade means comprises a first stationary cutting blade located downstream of the most downstream of said plurality of rotary cutting blades.

10. A mulching deck as in claim 9 wherein said first stationary cutting blade is mounted in said housing such that eddy currents are created tending to recirculate clippings into comminuting contact with said first stationary cutting blade and said most downstream of said rotary cutting blades.

11. A mulching deck as in claim 9 wherein additional stationary cutting blades are mounted in said housing adjacent said rotary cutting blades, each of said additional stationary cutting blades being positioned adjacent a respective one of said rotary cutting blades in the path of clippings entrained in an air stream swirling around said respective one of said rotary cutting blades.

12. A mulching deck as in claim 9 wherein the number of said rotary cutting blades and said additional stationary cutting blades is three.

13. A mulching deck for cutting and mulching grass, comprising:

(a) a housing;

(b) a plurality of rotary cutting blades in said housing for cutting said grass into clippings;

(c) means for driving at least some of said rotary cutting blades; and (d) a plurality of stationary cutting blades in said housing for further cutting said clippings, wherein said plurality of stationary cutting blades includes a stationary cutting blade fixed to said housing downstream of the most downstream of said rotary cutting blades.

14. A mulching deck as set forth in claim 13, wherein said plurality of stationary cutting blades includes at least one stationary cutting blade positioned adjacent one of said plurality of rotary cutting blades.

15. A mulching deck as set forth in claim 13, wherein said plurality of stationary cutting blades includes additional stationary cutting blades positioned between adjacent rotary cutting blades.

16. A mulching deck as set forth in claim 13, further comprising at least one deflector mounted in said housing between a pair of said rotary cutting blades.

17. A mulching deck as set forth in claim 13, further comprising a plurality of deflectors, each being mounted in said housing between an adjacent pair of said rotary cutting blades.

18. A mulching deck as set forth in claim 16, wherein said deflector comprises a pair of triangularly shaped plates joined to form a pyramid-like structure.

19. A mulching deck as set forth in claim 17, wherein said plurality of deflectors each comprise a pair of triangularly shaped plates joined to form a pyramid-like structure.

20. A mulching deck for cutting and mulching grass, comprising:

(a) a housing;

(b) a plurality of rotary cutting blades in said housing for cutting said grass into clippings;

(c) means for driving at least some of said rotary cutting blades; and (d) a plurality of stationary cutting blades in said housing for further cutting said clippings; wherein said plurality of stationary cutting blades includes one stationary cutting blade positioned between adjacent ones of said plurality of rotary cutting blades.

21. A kit for converting a conventional multi-bladed mowing deck into a multi-bladed mulching deck, said mowing deck comprising a housing and a plurality of rotary cutting blades within said housing, said housing including a plurality of wall portions partially surrounding said rotary cutting blades, a tunnel, and a discharge chute, said kit comprising:

(a) first plate means adapted to cover said tunnel;

(b) second plate means adapted to close said discharge chute; and (c) stationary cutting blade means adapted to be affixed to said housing for further cutting grass confined to said housing.

22. The kit of claim 21 wherein said stationary cutting blade means includes a plurality of additional stationary cutting blades, each of said additional stationary cutting blades being fixed to said housing and positioned to comminute clippings entrained in air streams swirling around an adjacent upstream rotary cutting blade.

23. A kit as set forth in claim 21, wherein said stationary cutting blade means includes a stationary cutting blade adapted to be affixed to said housing in the vicinity of said discharge chute.

24. A kit as set forth in claim 21, wherein said stationary cutting blade means includes a stationary cutting blade being fixed to said housing adjacent one of said rotary cutting blades.

25. A kit as set forth in claim 21, wherein said stationary cutting blade means includes a plurality of stationary cutting blades each being fixed to said housing between adjacent pairs of said rotary cutting blades.

26. A kit as set forth in claim 21, further comprising deflector means adapted to be mounted on said first plate means.

27. A kit as set forth in claim 26, wherein said deflector means includes a pair of deflectors mounted on said first plate, each of said deflector means being positioned between a pair of said rotary cutting blades.

28. A kit as set forth in claim 27, wherein said deflectors each comprise a pair of triangularly shaped plates joined to form a pyramid-like structure.

29. A mulching deck for cutting and mulching grass, comprising:
- (a) a housing having an internal chamber opening downwardly;
- (b) a plurality of rotary cutting blades in said chamber for cutting said grass into clippings;
- (c) said housing including imperforate skit means surrounding said chamber for confining the grass clippings thereto;
- (d) means for driving at least some of said rotary cutting blades; and
- (e) stationary cutting blade means affixed to said housing in said chamber for further cutting said clippings confined to said housing.

30. A mulching deck as set forth in claim 29, wherein said stationary cutting blade means includes a stationary cutting blade being fixed to said housing adjacent one of said rotary cutting blades.

31. A mulching deck as set forth in claim 29, wherein said stationary cutting blade means includes a plurality of stationary cutting blades each being fixed to said housing between adjacent pairs of said rotary cutting blades.

32. A mulching deck as set forth in claim 29, wherein said stationary cutting blade means includes a stationary cutting blade fixed to said housing downstream of the most downstream of said rotary cutting blades.

33. A mulching deck as set forth in claim 29, wherein said plurality of stationary cutting blades means includes one stationary cutting blade located downstream of the most downstream of said plurality of rotary cutting blades, and additional stationary cutting blades positioned between adjacent rotary cutting blades.

* * * * *